(12) United States Patent
Gittleman

(10) Patent No.: US 6,635,372 B2
(45) Date of Patent: Oct. 21, 2003

(54) METHOD OF DELIVERING FUEL AND AIR TO A FUEL CELL SYSTEM

(75) Inventor: Craig S. Gittleman, Rochester, NY (US)

(73) Assignee: General Motors Corporation, Detroit, MI (US)

(*) Notice: Subject to any disclaimer, the term of this patent is extended or adjusted under 35 U.S.C. 154(b) by 171 days.

(21) Appl. No.: 09/967,278

(22) Filed: Oct. 1, 2001

(65) Prior Publication Data

US 2003/0064259 A1 Apr. 3, 2003

(51) Int. Cl.$^7$ ................................................ H02M 8/04
(52) U.S. Cl. ............................................ 429/17; 429/24
(58) Field of Search .............................. 429/12, 13, 17, 429/22, 24

(56) References Cited

U.S. PATENT DOCUMENTS

| | | | |
|---|---|---|---|
| 5,292,428 A | 3/1994 | Harrison et al. | 208/208 R |
| 5,302,470 A | 4/1994 | Okada et al. | 429/17 |
| 5,554,454 A | 9/1996 | Gardner et al. | 429/19 |
| 6,042,798 A * | 3/2000 | Masuda et al. | 423/244.01 |
| 6,159,256 A | 12/2000 | Bonville, Jr. et al. | 48/61 |
| 6,184,176 B1 * | 2/2001 | Khare | 502/407 |

OTHER PUBLICATIONS

King et al, "Desulfurization of Gasoline Feedstocks for Application in Fuel Reforming," SAE Technical Paper 2000–01–0002, SAE 2000 World Congress, Mar. 6–9, 2000.

* cited by examiner

Primary Examiner—Randy Gulakowski
Assistant Examiner—Monique Wills
(74) Attorney, Agent, or Firm—Cary W. Brooks

(57) ABSTRACT

A method for removing sulfur-containing species from a liquid hydrocarbon fuel and capturing a portion of vaporized sulfur-free fuel to be processed into hydrogen for use in a fuel cell engine. Sulfur is removed by heating the fuel under pressure to keep the fuel in the liquid phase, and passing it over a sulfur trap that contains an adsorbent bed that adsorbs the sulfur-containing species in the fuel. The sulfur-free fuel is depressurized to a two-phase hydrocarbon mixture. The vapor/liquid mixture is separated, and the liquid portion is sent to a fuel processor system. The vapor portion is sent to a vapor canister where it is adsorbed on an activated carbon adsorbent. The adsorbed hydrocarbon vapors are desorbed from the vapor trap by purging it with air when the fuel cell engine is first started up.

44 Claims, 1 Drawing Sheet

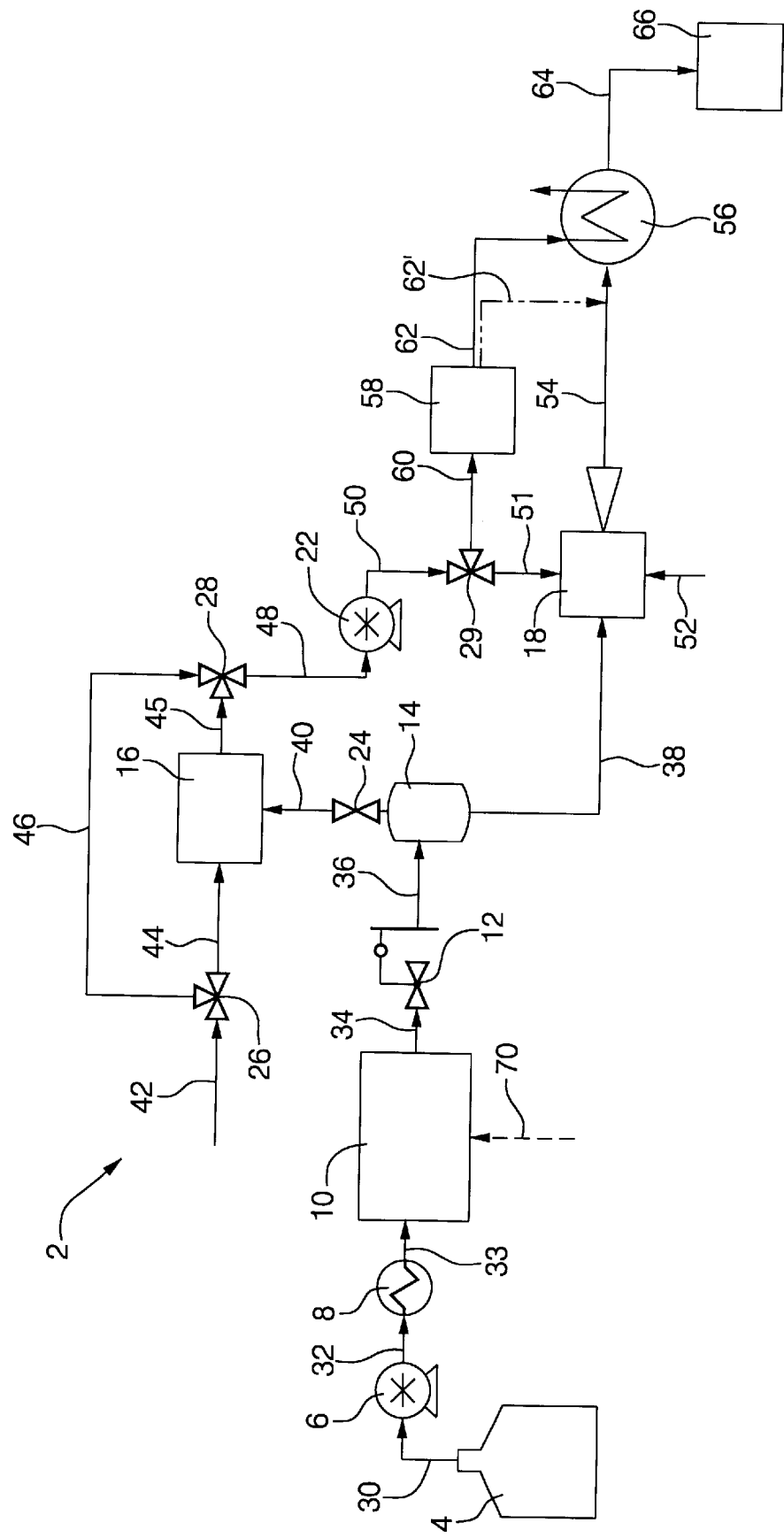

METHOD OF DELIVERING FUEL AND AIR TO A FUEL CELL SYSTEM

FIELD OF THE INVENTION

This invention relates to a method of delivering fuel and air to a fuel cell system, and more particularly to a method of removing sulfur-containing species from a liquid hydrocarbon fuel used to produce a hydrogen source for the fuel cell.

BACKGROUND OF THE INVENTION

In proton exchange membrane (PEM) fuel cells, hydrogen ($H_2$) is the anode reactant (i.e., fuel) and oxygen is the cathode reactant (i.e., oxidant). The oxygen can be either a pure form ($O_2$) or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and mixed with a proton conductive resin. The catalytic particles are typically costly precious metal particles. These membrane electrode assemblies are relatively expensive to manufacture and require certain conditions for effective operation. These conditions include proper water management and humidification, and control of catalyst fouling constituents, such as carbon monoxide (CO) and sulfur.

For vehicular applications, it is desirable to use a liquid fuel such as gasoline as the source of hydrogen for the fuel cell. Such liquid fuels for the vehicle are easy to store onboard, and there is a nationwide infrastructure for supplying liquid fuels. However, such fuels must be dissociated to release the hydrogen content thereof for fueling the fuel cell. The dissociation reaction is accomplished within a chemical fuel processor or reformer. The fuel processor contains one or more reactors wherein the fuel reacts with steam (and sometimes air) to yield a reformate gas comprising primarily hydrogen and carbon dioxide. In an autothermal gasoline reformation process, steam, air and gasoline are reacted in a primary reactor that performs two reactions. One is a partial oxidation reaction (POX) and the other is steam reforming (SR). The primary reactor produces a reformate stream comprising primarily hydrogen, carbon dioxide, carbon monoxide, nitrogen and water. Downstream reactors may include water/gas shift (WGS) reactors for reacting carbon monoxide with water to create hydrogen and carbon dioxide and preferential oxidation (PROX) reactors for selectively oxidizing carbon monoxide in the presence of hydrogen to produce carbon dioxide ($CO_2$), using oxygen from air as an oxidant.

One of the greatest challenges to the development of a fuel cell-powered vehicle using on-board fuel processing of liquid hydrocarbon fuel, such as gasoline, for $H_2$ generation is the ability to remove sulfur from the gasoline. Gasoline produced in the United States today contains at least 30 ppm sulfur by weight. The sulfur is present in a variety of organic sulfur-containing species such as mercaptans, sulfides, disulfides, tetrahydrothiophenes, thiophenes, and benzothiophenes. Typical fuel processor systems contain catalysts to perform reforming, water gas shift, and preferential oxidation reactions. These catalysts, particularly the water gas shift catalysts, are irreversibly poisoned by sulfur. Furthermore, the catalysts at the electrodes of a fuel cell stack typically contain platinum, which is irreversibly poisoned by sulfur. Therefore, it is crucial that the sulfur level in gasoline be reduced to levels tolerable by the fuel cell system catalysts.

One way to remove the sulfur is to place a sulfur trap downstream of the primary reactor (which may be a steam reformer, a partial oxidation reactor, or an autothermal reactor). The primary reactor converts the hydrocarbon fuel to a reformate stream which comprises primarily $H_2$ and CO, and converts essentially all of the sulfur in the fuel to hydrogen sulfide ($H_2S$). A material such as zinc oxide (ZnO) may then be used to adsorb the $H_2S$. However, the ZnO must be at least 300° C. to effectively adsorb the $H_2S$. Upon starting up the fuel cell system from low temperatures, the ZnO would be too cold to adsorb the $H_2S$. The $H_2S$ would then be allowed to flow to reactors downstream of the sulfur trap, such as the water gas shift reactor and the preferential oxidation reactor (PrOx), and poison the catalysts in those reactors. Additionally, ZnO is not effective at removing $H_2S$ to low levels in the presence of water, and gasoline fuel processor systems may contain upwards of 30% water in the effluent from the primary reactor. Furthermore, a ZnO-containing sulfur trap offers no protection for the catalysts in the primary reactor, whose performance may be adversely affected by the presence of sulfur.

Another option is to remove the sulfur directly from the fuel before it enters the primary reactor. It would be desirable to be able to adsorb the sulfur-containing species at room temperature. However, while there has been significant research in that area, to date no materials have been identified which will adsorb all of the types of sulfur species that are present in gasoline in the presence of a liquid hydrocarbon mixture which contains olefins and aromatics. The most promising technology uses a nickel (Ni) catalyst to react with the organic sulfur-containing species to form nickel sulfide (NiS) and desulfurized hydrocarbons as disclosed in U.S. Pat. No. 6,159,256. The reaction can occur at temperatures ranging from 200° F. to 525° F. A portion of the desulfurized liquid fuel can be collected and kept in a separate fuel tank. The desulfurized fuel can then be used to start up the fuel processor at low temperatures, before the Ni-containing sulfur trap reaches its operating temperature. However, some heat still needs to be provided to the system at startup to vaporize the sulfur-free liquid fuel.

U.S. Pat. No. 5,292,428 discloses a method for desulfurization of liquid hydrocarbon fuel utilizing hydrodesulfurization. Hydrodesulfurization involves reacting the fuel with $H_2$ in the presence of a catalyst to convert the organic sulfur-containing species to $H_2S$, and subsequently adsorbing the $H_2S$ on ZnO. This process is not suitable for automotive applications because it requires two unit operations (hydrotreating reactor and ZnO $H_2S$ scrubber) that consume valuable space in a fuel cell system. U.S. Pat. No. 6,042,798 discloses a process in which sulfur-containing organic species are removed from a hydrocarbon mixture in a single unit by passing said hydrocarbon mixture over a co-precipitated copper-zinc catalyst in the presence of hydrogen. U.S. Pat. No. 6,184,176 discloses a similar process that uses a sorbent comprising a mixture of zinc oxide, silica, alumina, and reduced cobalt to desulfurize a hydrocarbon stream in the presence of hydrogen. Such processes are not suitable for automotive applications because they operate at high pressures and temperatures and utilize hydrogen, which requires a recycle of the $H_2$ product from the fuel processor.

The current invention provides a method for supplying air and sulfur-free hydrocarbon fuel vapor upon start-up of a fuel cell engine, as well as a means for replacing the supply of sulfur-free hydrocarbon fuel vapor during normal engine operation. No external heat is required to provide the air/fuel vapor mixture to the inlet of the fuel processor system.

SUMMARY OF THE INVENTION

This invention includes a method for removing sulfur-containing species from a liquid hydrocarbon fuel and capturing a portion of vaporized sulfur-free fuel to be processed into hydrogen for use in a fuel cell engine. Sulfur is removed from a hydrocarbon fuel such as gasoline, diesel, or kerosene by heating the fuel under pressure to keep the fuel in the liquid phase, and passing it over a sulfur trap that contains an adsorbent bed that adsorbs the sulfur-containing species in the fuel. The sulfur-free fuel that exits the adsorbent bed is slightly depressurized to generate a two-phase hydrocarbon mixture. The vapor/liquid mixture is separated, and the liquid portion is sent to the inlet of a fuel processor system where it is mixed with air and steam to produce a hydrogen-rich reformate mixture. The vapor portion of the sulfur-free hydrocarbon mixture is sent to a vapor canister where it is adsorbed on an activated carbon adsorbent. The adsorbed hydrocarbon vapors are desorbed from the vapor trap by purging it with air when the fuel cell engine is first started up. The mixture of air and sulfur-free hydrocarbon fuel is sent to a thermal start device or to the fuel processing system to be used to rapidly start the fuel cell engine using sulfur-free fuel before the liquid-phase sulfur trap has reached an operating temperature sufficient to remove sulfur components from the liquid fuel. This method therefore provides a means to remove sulfur from a liquid hydrocarbon fuel to be processed into hydrogen and a means to rapidly start the fuel processor system by utilizing captured sulfur-free hydrocarbon vapor.

These and other objects, features and advantages of the present invention will be apparent from the following brief description of the drawing, detailed description of the preferred embodiments and appended claims and drawing.

BRIEF DESCRIPTION OF THE DRAWING

The drawing is a schematic illustrating a fuel and air delivery system and a method of operating the same according to the present invention.

DETAILED DESCRIPTION OF PREFERRED EMBODIMENTS

A preferred method of the invention is described with reference to the drawing. The drawing is a schematic of a fuel and air delivery system 2 for supplying liquid hydrocarbon fuel and air to a fuel processor for generating hydrogen for a fuel cell engine. The following describes the operation of the method of the invention during normal operating. Fuel tank 4 is filled with a liquid organic or hydrocarbon fuel mixture such as gasoline, diesel, kerosene or the like. Fuel is drawn from fuel tank 4 through line 30 into fuel pump 6 where it is pressurized to ensure that the fuel remains in liquid phase upon heating. For gasoline, for example, the fuel may be pressurized to 1000 kPa. The pressurized fuel flows through line 32 into heat exchanger 8 where is it heated to a temperature between 150° C. and 400° C. For gasoline at 1000 kPa, for example, the fuel should be heated to about 200° C. The heat used to raise the temperature of the fuel in heat exchanger 8 can be provided by any of a variety of streams in the fuel cell engine such as air, steam, reformate, or exhaust from a combustor or from an independent temperature regulating fluid such as oil. Alternatively, the fuel can be heated by using an electric heat supply. The hot, pressurized fuel flows from heat exchanger 8 through line 33 into sulfur trap 10.

Sulfur trap 10 contains an adsorbent material(s) to adsorb the sulfur-containing species from the liquid hydrocarbon fuel. The adsorbent(s) must be able to adsorb all types of sulfur-containing species in the fuel. In gasoline, for example, such sulfur-containing species may include mercaptans, sulfides, disulfides, tetrahydrothiophenes, thiophenes, and benzothiophenes. The sulfur trap 10 may contain a single adsorbent that is selective for the adsorption of all of these sulfur-containing species or multiple adsorbents that are each selective for different sulfur-containing species. Such adsorbent materials may include metals such as nickel, copper, zinc, cobalt, molybdenum and/or their oxides and mixtures thereof.

Heat is provided through line 70 to heat sulfur trap 10 to its operating temperature and maintain it at that temperature. The heat may be provided by an electrical heat supply or by indirect heating by exchanging heat with a hot fluid. Such hot fluid could be a stream from the fuel processor system such as air, steam, reformate, or exhaust from a combustor or from an independent temperature regulating fluid such as oil. The temperature of the sulfur trap should be maintained between 150° C. and 400° C.

The fuel exits the sulfur trap through line 34 and should contain no more than 1.0 ppm sulfur. Preferably, the fuel exiting the sulfur trap should contain no more than 0.5 ppm sulfur, and most preferably less than 0.05 ppm sulfur. This fuel exiting the sulfur trap 10 will henceforth be designated sulfur-free fuel. The pressure of the sulfur-free hydrocarbon fuel mixture is reduced at pressure reducer 12. Pressure reducer 12 may be a valve, orifice, regulator, expander, nozzle, or any other means of pressure reduction. The pressure is reduced to a level so to flash about 1%–10% of the fuel into a vapor, while the remaining sulfur-free fuel remains in the liquid phase. For gasoline at 200° C., for example, the pressure should be reduced to about 800 kPa. The reduced-pressure, two-phase, sulfur-free hydrocarbon fuel mixture flows through line 36 into vapor/liquid separator vessel 14. Alternatively, the pressure of the sulfur-free fuel leaving sulfur trap 10 may be reduced directly upon entering vapor/liquid separator vessel 14, in which case vapor/liquid separator vessel 14 serves a flash separator.

Preferably, pressure reducer 12 is controllable so that the pressure of the sulfur-free hydrocarbon fuel is only reduced when it is desirable to generate sulfur-free hydrocarbon fuel vapor. Otherwise, the pressure is not reduced across pressure reducer 12, and the sulfur-free fuel remains completely in the liquid phase. In that case, single-phase sulfur-free liquid fuel flows through line 36 to vapor/liquid separator vessel 14.

The liquid fraction of the sulfur-free hydrocarbon fuel leaves vapor/liquid separator vessel 14 through line 38 where it flows to the inlet 18 to the fuel processor 56. The inlet 18 may be an injector, ejector, mixer, or other suitable device for mixing the fuel, air, and water streams and delivering said mixture to fuel processor 56. If the fuel entering vapor/liquid separator vessel 14 is a single-phase liquid, then the entire fuel stream flows through line 38 to the fuel processor inlet 18. In inlet 18, the sulfur-free fuel is mixed with air from line 51 and steam from line 52. Alternatively, the fuel, air and steam may be mixed in any combination before entering inlet 18. Another alternative allows for the sulfur-free liquid hydrocarbon fuel to be vaporized before entering inlet 18. The fuel/air/steam mixture enters the fuel processor 56 through line 54 where it is processed into hydrogen to be used for generating electricity in a fuel cell stack. Fuel processor 56 actually comprises a series of reactors that are described below.

The vapor fraction of the sulfur-free fuel exits vapor/liquid separator vessel 14 through line 40. When valve 24 in line 40 is open, sulfur-free hydrocarbon fuel vapor flows through line 40 to vapor canister 16. Valve 24 also serves to reduce the pressure of the sulfur-free hydrocarbon vapor in line 40 to the pressure of vapor canister 16. Preferably, the pressure of the vapor canister 16 is close to atmospheric pressure to allow for rapid desorption of the hydrocarbon vapors as described below. The sulfur-free hydrocarbon fuel vapor adsorbs on the adsorbent, preferably activated carbon, in vapor canister 16. Vapor canister 16 is not insulated so that it is maintained at about atmospheric temperature. There should be a pressure relief valve (not shown) on vapor canister 16 to prevent over pressurization of the canister. When the adsorbent in vapor canister 16 holds enough sulfur-free hydrocarbon vapor to start up the fuel processor (see below), valve 24 is closed and pressure reducer 12 is set so that there is no reduction in pressure of the sulfur-free liquid hydrocarbon fuel stream in line 34. Therefore, no sulfur-free hydrocarbon vapor is created. It is preferred that vapor canister 16 does not approach saturation with sulfur-free hydrocarbon fuel vapor during normal operation as described above so that there is room in the vapor canister for diurnal vapors from the fuel tank. A standard, two-liter, automotive vapor canister holds about 100 g of hydrocarbon vapors.

The hydrocarbon vapors adsorbed in vapor canister 16 are subsequently used to start up the fuel processor when the system is started up at cold temperatures and the sulfur trap 10 is not hot enough to effectively adsorb the sulfur-containing species in the fuel. The temperature of the sulfur trap is monitored (by a sensor, not shown) to determine if the adsorbent in the sulfur trap is at an elevated operating temperature sufficient to remove sulfur-containing constituents in the liquid fuel. If the temperature of the sulfur trap adsorbent is too low to effectively remove sulfur-containing constituents, the pump 6 is not turned on, and instead the hydrocarbon vapors are purged from vapor canister 16 by flowing air through the canister. Air enters the fuel-air delivery system 2 through line 42. The portion of the air that is required to desorb the hydrocarbon vapors at the desired rate is directed to line 44 by splitter valve 26. The air in line 44 is fed into vapor canister 16. The remainder of the air entering fuel-air delivery system 2 though line 42 is directed to line 46, which bypasses the vapor canister, by splitter valve 26. Valve 26 is controlled so that an appropriate amount of air flows through and bypasses vapor canister 16, respectively. During normal fuel processor operation, all of the air in line 42 is diverted by splitter valve 26 to bypass vapor canister 16 via line 46. A central processing unit (CPU) (not shown) is provided and operatively connected to the various system components to control the components (such as valves and pumps) based on feedback from the components and sensors.

During startup, the air from line 44 purges the adsorbed hydrocarbon vapors from vapor canister 16. The rate at which the adsorbed vapors are purged depends on the flow rate, the temperature and the pressure of purge air stream in line 44. In general, desorption is most rapid at higher air flows, lower pressures and higher temperatures. The purged hydrocarbon vapors exit vapor canister 16 with the purged air through line 45. The air stream with the purged hydrocarbon vapors in line 45 is recombined with the air that bypasses vapor canister 16 though line 46 in mixing valve 28.

The combined air stream with the purged hydrocarbon vapors flows through line 48 to the inlet of compressor 22, where it is compressed to the desired inlet pressure for the fuel processor inlet 18. The compressed air and hydrocarbon vapors exit compressor 22 through line 50. Valve 29 is set so that the compressed air and hydrocarbon vapor mixture is directed via line 51 to inlet 18. From inlet 18 the sulfur-free fuel and air mixture is directed via line 54 to fuel processor 56. The compressed air and hydrocarbon vapor fuel is used to start up fuel processor 56 and rapidly generate stack-grade hydrogen. Water may also optionally be added to inlet 18 via line 52 during startup. During normal operation, when all of the air fed to fuel delivery system 2 bypasses vapor canister 16, the compressed air in stream 50 is directed by valve 29 to fuel processor inlet 18 via line 51.

In an alternative start-up scenario, the sulfur-free fuel and air mixture flows into a thermal start device 58 where the fuel vapor is combusted to generate heat to rapidly raise the temperature of the fuel processor 56. In this scenario, valve 29 is set to direct the compressed air and hydrocarbon vapor mixture via line 60 to thermal start device 58. In thermal start device 58, the fuel and air mixture is combusted to generate heat. The ignition source for combustion may be a spark plug, glow plug, electrically heated catalyst (EHC), or some other suitable ignition source. The hot exhaust gas from thermal start device 58 flows into fuel processor 56. This hot exhaust gas may be used to raise the temperature of fuel processor 56 either directly by flowing the exhaust gas through the reactors in fuel processor 56 via line 62' or indirectly by using heat exchangers via line 62.

In another alternative scenario, the compressor 22 may be placed upstream of vapor canister 16. In that case, the air stream in line 42 is compressed and the compressed air is used to purge the adsorbed hydrocarbon vapors from vapor canister 16. This is not as effective as purging with low pressure air, as the rate of hydrocarbon desorption from vapor canister 16 is proportional to the volume of air flowing through the canister. In this case, the pressure of vapor canister 16 must be greater than the pressure of inlet 18. In either case, it may be necessary to heat all the lines between the outlet of vapor canister 16 and inlet 18 to prevent condensation of the hydrocarbon vapors. Alternatively, all lines between the outlet of vapor canister 16 and inlet 18 should flow downward so that any condensed vapor would reach inlet 18 without liquid pooling in these lines.

The fuel processor 56 according to the present invention consists of a series of reactors. These reactors include a primary reactor where the fuel, air and water mixture is converted into a hydrogen-rich reformate stream which may also contain carbon monoxide, carbon dioxide, water, nitrogen and methane. The primary reactor, which may be a steam reformer, a partial oxidation reactor, or an autothermal reformer, contains a catalyst or combination of catalysts which are used to convert the fuel/air/water mixture into the hydrogen-rich reformate. Fuel processor 56 may also include a high-temperature water-gas shift reactor downstream of the primary reactor to reduce the level of carbon monoxide in the hydrogen-rich reformate. The hydrogen-rich reformate may then be sent to a low-temperature water-gas shift reactor, also contained within fuel processor 56, to further reduce the concentration of carbon monoxide. The hydrogen-rich reformate stream may then be delivered to a preferential oxidation reactor within fuel processor 56 to preferentially oxidize the remaining carbon monoxide still in the reformate stream. Finally, the hydrogen-rich reformate stream leaving fuel processor 56 is delivered to a fuel cell stack 66 via line 64 where the hydrogen is used to create electricity.

After sulfur trap 10 and the reactors in fuel processor 56 are hot enough to generate stack-grade hydrogen from liquid fuel, the system switches to its normal operation mode of passing liquid fuel through the sulfur trap 10 and into inlet 18. In that scenario, valves 26 and 28 direct the air to bypass vapor canister 16 and valve 29 is set to direct the compressed air to inlet 18. Vapor canister 16 is refilled by setting pressure reducer 12 so as to generate some hydrocarbon vapor and opening valve 24 to allow the vapor into the canister. After the vapor canister 16 has been refilled with hydrocarbon vapors, pressure reducer 12 and valve 24 are reset to maintain single-phase liquid hydrocarbon fuel flow from sulfur trap 10 to inlet 18.

In one embodiment of the preferred method described above, the normal diurnal and refueling vapors generated in fuel tank 4 are also adsorbed in vapor canister 16. This would be accomplished by connecting a line (not shown) between fuel tank 4 and vapor canister 16. In this case, it would be nearly impossible to insure that the diurnal and refueling vapors would be free of sulfur. However, it is likely that the amount of sulfur in these vapors would be low enough so as not to have a significant effect on the fuel processor system. This can also be remedied by including a small sulfur trap containing an $H_2S$ adsorbent such as zinc oxide (ZnO) within the fuel processor 56 downstream of the primary reactor and upstream of the water gas shift reactor (s). The alternative to this approach is to use a separate vapor canister to capture the normal diurnal and refueling vapors generated in fuel tank 4.

Advantages of the method for fuel and air delivery utilizing an elevated temperature liquid-phase trap for fuel desulfurization and a vapor canister for storage of sulfur-free hydrocarbon vapor as compared to existing methods may include one or more of the following. First, the ability to remove sulfur directly from the fuel, therefore protecting the primary reactor catalyst(s) from sulfur. Second, the ability to store sulfur-free fuel vapor for rapid start-up of a fuel cell engine. Third, utilization of fuel processor feed air to purge hydrocarbon vapors from sulfur trap. Fourth, the elimination of hydrogen recycle for hydrodesulfurization. Finally, elimination of the heat required to vaporize fuel for thermal start of the fuel processor.

While preferred embodiments, forms and arrangements of parts of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A method comprising:
   (a) providing an organic fuel storage tank and an organic fuel therein, and wherein the organic fuel is in a liquid phase and contains more than 1 part per million sulfur;
   (b) providing a sulfur trap including an adsorbent for adsorbing sulfur-containing species in the organic fuel, and wherein the sulfur trap adsorbent must be heated to an elevated operating temperature to effectively adsorb sulfur-containing species;
   (c) providing a vapor canister including an adsorbent for adsorbing organic fuel vapors and providing organic fuel vapors adsorbed in the vapor canister, and wherein the organic fuel vapors contain no more than 1 part per million sulfur;
   (d) providing a fuel processor including a catalyst therein for processing the organic fuel to produce hydrogen;
   (e) providing a fuel cell including a catalyst therein, and wherein the fuel cell is constructed and arranged to use hydrogen to produce electricity;
   (f) monitoring the temperature of the adsorbent in the sulfur trap to determine if the adsorbent is at an elevated operating temperature sufficient to remove sulfur-containing constituent from liquid fuel so that the liquid fuel exiting the sulfur trap contains no more than 1 part per million sulfur;
   (g) performing steps h–l while the temperature of the adsorbent in the sulfur trap is below the elevated operating temperature;
   (h) purging at least a portion of the organic fuel vapors from the vapor canister;
   (i) charging the fuel processor with the organic fuel vapors;
   (j) processing at least a portion of the organic fuel vapors in the fuel processor to produce hydrogen;
   (k) charging the fuel cell with the hydrogen produced in the fuel cell processor from the organic fuel vapors to produce electricity;
   (l) heating the adsorbent in the sulfur trap to the elevated operating temperature;
   (m) performing steps n–w while the temperature of the adsorbent in the sulfur trap is at or above the elevated operating temperature;
   (n) removing organic fuel from the fuel storage tank;
   (o) pumping the organic fuel from the fuel storage tank to an elevated pressure;
   (p) heating the fuel from the fuel storage tank to an elevated temperature and maintaining the fuel in the liquid phase;
   (q) flowing the fuel from the fuel storage tank at the elevated pressure and elevated temperature through the sulfur trap so that the adsorbent in the fuel trap removes sulfur-containing species from the organic fuel and so that the organic fuel contains no more than 1 part per million sulfur;
   (r) reducing the pressure of the organic fuel containing no more than 1 parts per million sulfur to provide a liquid fuel and a vapor fuel;
   (s) separating the liquid fuel from the vapor fuel;
   (t) charging the fuel processor with the liquid fuel;
   (u) processing the liquid fuel to produce hydrogen;
   (v) delivering the hydrogen produced in the fuel processor from the liquid fuel to the fuel cell to produce electricity; and
   (w) charging the vapor canister with the vapor fuel so that the vapor fuel is adsorbed onto the adsorbent in the fuel canister.

2. A method as set forth in claim 1 wherein the catalyst in the fuel processor is poisoned by an organic fuel containing more than 1 part per million sulfur.

3. A method as set forth in claim 1 wherein the catalyst in the fuel cell is poisoned by a fuel containing more than 1 part per million sulfur.

4. A method as set forth in claim 1 wherein the adsorbent in the sulfur trap is constructed and arranged to adsorb sulfur-containing species so that the organic fuel in the sulfur trap contains no more than 1 part per million sulfur.

5. A method as set forth in claim 1 wherein the adsorbent in the sulfur trap is constructed and arranged to adsorb sulfur-containing species so that the organic fuel in the sulfur trap contains no more than 0.5 part per million sulfur.

6. A method as set forth in claim 1 wherein the adsorbent in the sulfur trap is constructed and arranged to adsorb sulfur-containing species so that the organic fuel in the sulfur trap contains no more than 0.05 part per million sulfur.

7. A method as set forth in claim 1 wherein the step of (h) purging at least a portion of the organic fuel vapors from the vapor canister comprises injecting air into and through the canister to provide an organic fuel vapor/air mixture.

8. A method as set forth in claim 7 wherein the step of processing the organic fuel vapor in the fuel processor to produce hydrogen comprises processing the vapor/air mixture in the fuel processor.

9. A method as set forth in claim 8 further comprising the step of (i(1)) pumping the organic fuel vapor/air mixture to an elevated pressure prior to processing the organic fuel vapors in the fuel processor.

10. A method as set forth in claim 1 wherein the fuel processor includes at least one reactor including a catalyst that is poisoned by processing material containing more than 1 part per million sulfur.

11. A method as set forth in claim 1 wherein the fuel processor comprises a preferential oxidation reactor, and wherein the preferential oxidation reactor includes a catalyst that is poisoned by processing material containing more than 1 part per million sulfur.

12. A method as set forth in claim 1 wherein the fuel processor comprises a water gas shift reactor, and wherein the water gas shift reactor includes a catalyst that is poisoned by processing material containing more than 1 part per million sulfur.

13. A method as set forth in claim 1 wherein the fuel processor comprises a autothermal reformer, and wherein the autothermal reformer includes a catalyst that is poisoned by processing material containing more than 1 part per million sulfur.

14. A method as set forth in claim 1 further comprising the step of (e(1)) providing a liquid/gas separator, and wherein the step of (s) separating the liquid fuel and vapor fuel is carried out in the liquid/gas separator.

15. A method as set forth in claim 1 further comprising the step of (e(2)) providing a pressure reducer downstream of the sulfur trap to perform the step of reducing the pressure of the organic fuel and to provide the liquid fuel and the vapor fuel.

16. A method as set forth in claim 1 wherein the adsorbent in the sulfur trap comprises at least one selected from the group consisting of nickel, copper, zinc, cobalt, molybdenum and oxides of the same and mixtures thereof.

17. A method as set forth in claim 1 wherein the adsorbent in the vapor canister comprises activated carbon.

18. A method as set forth in claim 1 wherein the organic fuel in the fuel storage tank comprises gasoline.

19. A method as set forth in claim 1 wherein the organic fuel in the fuel storage tank comprises a diesel fuel.

20. A method as set forth in claim 1 wherein the organic fuel in the fuel storage tank comprises kerosene.

21. A method as set forth in claim 1 wherein the sulfur-containing species comprises at least one selected from the group consisting of mercaptans, sulfides, disulfides, tetrahydrothiophenes, thiophenes and benzothiophenes and mixtures thereof.

22. A method as set forth in claim 1 wherein the fuel processor includes a steam reformer.

23. A method as set forth in claim 1 wherein the fuel processor includes an autothermal reformer.

24. A method as set forth in claim 1 wherein the fuel processor includes a partial oxidation reactor.

25. A method as set forth in claim 1 wherein the step of (u) processing the liquid fuel to produce hydrogen comprises steam reforming the liquid fuel.

26. A method as set forth in claim 1 wherein the step of (u) processing the liquid fuel to produce hydrogen comprises autothermal reforming the liquid fuel.

27. A method as set forth in claim 1 wherein the step of (u) processing the liquid fuel to produce hydrogen comprises partial oxidation of the liquid fuel.

28. A method as set forth in claim 1 further comprising the step of (t(1)) charging air and water into the fuel processor along with the liquid fuel.

29. A method as set forth in claim 1 further comprising (e(3)) providing a first air line connected to the vapor canister, a second air line connected from the vapor canister to the fuel processor, a control valve in the first air line, and a third air line connected to the control valve to bypass the vapor canister and connected to the second air line.

30. A method as set forth in claim 1 further comprising the step of (e(4)) providing a compressor upstream of the vapor canister and wherein the step of (h) purging at least a portion of the vapor canister comprises flowing compressed air from the air compressor through the vapor canister.

31. A method as set forth in claim 1 further comprising charging the vapor canister with diurnal vapors from the organic fuel tank.

32. A method as set forth in claim 1 further comprising the step of charging the vapor canister with refueling vapors from the fuel tank.

33. A method as set forth in claim 7 further comprising combustion of at least a portion of the organic fuel vapor from the vapor canister in a thermal startup device to generate hot gases and heating the fuel processor with the hot gases from the thermal startup device.

34. A method as set forth in claim 33 wherein the step of heating the fuel processor comprises flowing the hot gases generated by the thermal startup device through the fuel processor.

35. A method as set forth in claim 33 wherein the step of heating the fuel processor comprises flowing the hot gases generated by a thermal startup device through a heat exchanger in the fuel processor.

36. A method comprising:
(a) providing an organic fuel storage tank and an organic fuel therein, and wherein the organic fuel is in the liquid phase and contains more than 1 part per million sulfur;
(b) providing a sulfur trap including an adsorbent for adsorbing sulfur-containing species in the organic fuel, and wherein the sulfur trap adsorbent must be heated to an elevated operating temperature to effectively adsorb sulfur-containing species;
(c) providing a vapor canister including an adsorbent for adsorbing organic fuel vapors and providing organic fuel vapors adsorbed in the fuel canister, and wherein the organic fuel vapors contain no more than 1 part per million sulfur;
(d) providing a fuel processor inlet;
(e) monitoring the temperature of the adsorbent in the sulfur trap to determine if the adsorbent is at an elevated operating temperature sufficient to remove sulfur-containing constituent from liquid fuel so that the liquid fuel existing the sulfur trap contains no more than 1 part per million sulfur;
(f) performing steps g–i while the temperature of the adsorbent in the sulfur trap is below the elevated operating temperature;
(g) purging at least a portion of the organic fuel vapors from the vapor canister;
(h) charging the fuel processor inlet with the organic fuel vapors;
(i) heating the adsorbent in the sulfur trap to the elevated operating temperature;

(j) performing steps k–o while the temperature of the adsorbent in the sulfur trap is at or above the elevated operating temperature;

(k) removing organic fuel from the fuel storage tank;

(l) pumping the organic fuel from the fuel storage tank to an elevated pressure;

(m) heating the fuel from the fuel storage tank to an elevated temperature and maintaining the fuel in the liquid phase;

(n) flowing the fuel from the fuel storage tank at the elevated pressure and elevated temperature through the sulfur trap so that the adsorbent in the fuel trap removes sulfur-containing species from the organic fuel and so that the organic fuel contains no more than 1 part per million sulfur; and (o) charging the fuel processor inlet with the fuel from the sulfur trap.

37. A method as set forth in claim 36 further comprising the step of charging steam into the fuel processor inlet.

38. A method as set forth in claim 37 further comprising the step of charging air into the fuel processor inlet.

39. A method as set forth in claim 36 further comprising the step of charging air into the fuel processor inlet.

40. A method as set forth in claim 38 wherein the fuel processor inlet comprises a mixer for mixing the fuel, air and steam.

41. A method as set forth in claim 36 wherein the fuel processor inlet comprises an injector.

42. A method as set forth in claim 36 wherein the fuel processor inlet comprises an ejector.

43. A method as set forth in claim 36 further comprising the step of charging air into the fuel processor inlet, and wherein the fuel processor inlet comprises a mixer.

44. A method as set forth in claim 36 further comprising the step of charging steam into the fuel processor inlet, and wherein the fuel processor inlet comprises a mixer.

\* \* \* \* \*